United States Patent [19]

Enomoto

[11] Patent Number: 6,037,395
[45] Date of Patent: Mar. 14, 2000

[54] CONDUCTIVE RESIN COMPOSITION

[75] Inventor: Masaki Enomoto, Tokyo, Japan

[73] Assignee: Riken Vinyl Industry Co., Ltd., Tokyo

[21] Appl. No.: 09/023,930

[22] Filed: Feb. 13, 1998

[30] Foreign Application Priority Data

Feb. 14, 1997 [JP] Japan .................................. 9-044891

[51] Int. Cl.$^7$ .............................. C08K 5/35; C08K 3/08
[52] U.S. Cl. ............................. 524/97; 524/424; 524/439
[58] Field of Search ............................. 524/97, 424, 439

[56] References Cited

U.S. PATENT DOCUMENTS 4,772,422  9/1988  Hijikata et al. ........................ 252/511
4,824,723  4/1989  Campbell et al. ....................... 428/332
4,954,541  9/1990  Nakane et al. ........................... 524/86

*Primary Examiner*—Kriellion Sanders
*Attorney, Agent, or Firm*—Burgess, Ryan & Wayne

[57] ABSTRACT

A conductive material and an oxazoline ring-containing compound or a high-molecular compound obtained by (graft) copolymerization of at least one 2-oxazoline ring-containing compound are added to an aromatic polycarbonate resin and optionally a polyester resin having mainly a skeleton of 1,4 cyclohexanedimethanol origin as a glycol component, thereby obtaining a conductive resin composition significantly improved in strength characteristics and further moisture absorbability without deterioration of heat resistance.

6 Claims, No Drawings

CONDUCTIVE RESIN COMPOSITION

BACKGROUND OF THE INVENTION

1) Field of the Invention

The present invention relates to a conductive resin composition, and more particularly to a conductive resin composition significantly improved tensile elongation, impact strength and further moisture absorbability without deterioration of heat resistance by adding a conductive material and oxazoline ring-containing compound to an aromatic polycarbonate resin and optionally a specific polyester resin.

2) Background Art

Previously, conductive resin compositions have been widely utilized as parts and packaging materials in the electric and electronic fields. Examples of the conductive resin compositions generally used include conductive resin compositions to which conductive materials such as carbon black, carbon fiber, graphite, metal fillers and metal fiber are added. In particular, conductive resin compositions containing carbon black have been widely used mainly in industry because of their excellent economy.

The use of carbon black can relatively easily give conductivity to resins, but include the following problems. That is to say, carbon black is in the form of an extremely fine powder, so that it has a high surface activity, resulting in essential poor compatibility with many kinds of resins. For that reason, the compounding of carbon black requires a large amount of mechanical energy, and therefore, the resins are exposed to severe thermal circumstances in many cases. Further, in order to obtain conductivity, the addition of a relatively large amount of carbon black is required, so that the essential mechanical properties of the resins are liable to deteriorate. Consequently, the finally compounded resin compositions have the problem that they are generally brittle and poor in mechanical strength.

In such a situation, as a method for improving mechanical strength, giving attention to carbon black, the use of carbon black developed in structure having a DBP oil absorption of 300 ml/100 g or more is proposed. According to this method, the conductivity can be obtained by the addition of a relatively small amount of carbon black, so that the relative weight of carbon black to resins can be reduced. However, the volume percentage of carbon black added is high because of its very high bulk specific gravity, even if the weight thereof is decreased. Accordingly, the mechanical strength of the resulting compositions is not necessarily satisfied.

Conductive polycarbonate resins containing carbon black have recently been used as general purpose engineering plastics, for example, as parts and packaging materials in the electric and electronic fields, and it is expected that the demand therefor will be substantially increased after this, because they are excellent not only in the balance of heat resistance and strength, but also in economy. However, many of the commercial conductive polycarbonate resins are difficult to say that the heat resistance and strength characteristics are sufficiently exhibited, as described above.

On the other hand, as a method for inhibiting a decrease in mechanical strength, the addition of a thermoplastic elastomer or a rubber component as a third component is proposed. This method is a general method widely used for improving the impact strength of a resin filled with an ordinary filler. In the present circumstances, however, the impact characteristics are not improved so much for a decrease in thermal deformation temperature, although the impact strength is improved in many cases. In particular, under circumstances where the amount of the third component added to a resin requiring the heat resistance can not but be limited, things are not in a satisfactory situation.

Resins having moisture absorbability are generally polar resins having hydrophilic functional groups in many cases. Methods for inhibiting the moisture absorbability include, for example, a method for inhibiting the moisture absorbability by polymer alloy with a resin low in moisture absorbability. However, although the relative moisture absorbability can be decreased, fluctuations in local moisture-absorbed sites are produced according to the dispersed state.

Further, there is a method of introducing a functional group such as a benzene ring which can stereostructurally prevent the attack of water molecules into a site adjacent to a polar group by polymerization. According to this method, however, the original properties of a resin may be substantially changed, so that it is difficult to apply this method to usual resin blending techniques.

Furthermore, from the viewpoint of the compatibility with a resin, a method of dispersing a relatively low-molecular substance at the molecular level is also conceivable. However, the heat-resistant characteristics and strength characteristics of the resin is deteriorated by the influence of the low-molecular substance.

The polycarbonate resins are resins relatively low in moisture absorbability. However, they considerably absorb moisture under the circumstances of high temperature and humidity, because they have ester structures as main chains.

As described above, in the present circumstances, it is difficult to improve the strength characteristics and further the moisture absorbability of the carbon black-containing polycarbonate resins without deterioration of the original characteristics thereof.

SUMMARY OF THE INVENTION

It is therefore an object of the present invention to provide a conductive resin composition significantly improved tensile elongation, impact strength and further moisture absorbability without deterioration of heat resistance by adding a conductive material and an oxazoline ring-containing compound to an aromatic polycarbonate resin and optionally a specific polyester resin.

According to the present invention, there is provided a conductive resin composition in which 5 to 150 parts by weight of a conductive material (c) and 0.01 to 10 parts by weight of a 2-oxazoline ring-containing compound (d) represented by the following general formula (1) are added to the total amount, 100 parts by weight, of 60 to 100 parts by weight of an aromatic polycarbonate resin (a) and 40 to 0 part by weight of a polyester resin (b) having mainly a skeleton of cyclohexanedimetanol origin as a glycol component:

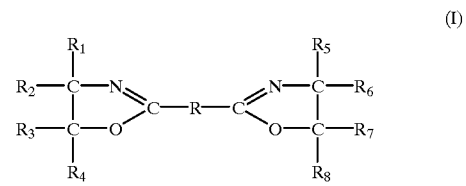

(I)

wherein R represents an alkyl group having 1 to 10 carbon atoms, an alkyl-substituted or unsubstituted phenyl group having 1 to 10 carbon atoms, an alkylene group having 2 to 10 carbon atoms or a 1,3- or 1,4-phenylene group; and $R_1$ to $R_8$ which may be the same or different, represent hydrogen atoms or alkyl groups each having 1 to 10 carbon atoms.

The above-mentioned constituent (b) is preferably a copolyester resin constituted by repetition of (i) a unit comprising mainly one kind of dibasic acid selected from the group consisting of terephthalic acid, aromatic acids other than terephthalic acid and alicyclic dicarboxylic acids as an acid component, and mainly cyclohexanedimethanol as a glycol component, and (ii) a unit comprising mainly one kind of dibasic acid selected from the group consisting of terephthalic acid, aromatic acids other than terephthalic acid and alicyclic dicarboxylic acids as an acid component, and mainly ethylene glycol as a glycol component.

Further, the above-mentioned constituent (b) is also preferably a polyester resin composition obtained by blending (i) a polymer constituted by repetition of a unit comprising mainly one kind of dibasic acid selected from the group consisting of terephthalic acid, aromatic acids other than terephthalic acid and alicyclic dicarboxylic acids as an acid component, and mainly cyclohexanedimethanol as a glycol component with (ii) a polymer constituted by repetition of a unit comprising mainly one kind of dibasic acid selected from the group consisting of terephthalic acid, aromatic acids other than terephthalic acid and alicyclic dicarboxylic acids as an acid component, and mainly ethylene glycol as a glycol component.

Furthermore, the above-mentioned constituent (b) may be a polymer constituted by repetition of (i) a unit comprising mainly one kind of dibasic acid selected from the group consisting of terephthalic acid, aromatic acids other than terephthalic acid and alicyclic dicarboxylic acids as an acid component, and mainly cyclohexanedimethanol as a glycol component.

The constituent (d) may be a 2-oxazoline ring-containing compound and/or a high-molecular compound obtained by (graft) copolymerization of a 2-oxazoline ring-containing compound. That is to say, the constituent (d) includes a copolymer of a 2-oxazoline ring-containing compound and a vinyl monomer such as styrene or acrylonitrile and a high-molecular compound obtained by graft-copolymerizing a 2-oxazoline ring-containing compound with a polymer such as polystyrene or a styrene-acrylonitrile copolymer at one or more active sites per molecule, as well as a 2-oxazoline ring-containing compound.

DESCRIPTION OF THE PREFERRED EMBODIMENTS

In the present invention, as the aromatic polycarbonate resins (a), general commercial products can be used. Examples thereof include "lupilon" (trade name) manufactured by Mitsubishi Gas Chemical Co., Inc., "Panlite" (trade name) manufactured by Teijin Chemicals Ltd., "NOVAREX" (trade name) manufactured by Mitsubishi Chemical Corp., and "CALIBRE" (trade name) manufactured by Sumitomo Dow Ltd.

As to the polyester resin (b), the constituent (i) means a polyester synthesized by using one kind of dibasic acid selected from the group consisting of terephthalic acid, aromatic acids other than terephthalic acid and alicyclic dicarboxylic acids as a main component of an acid component, and 1,4-cyclohexanedimethanol as a main component of a glycol component. For example, a polyester resin obtained by polycondensation with dimethyl terephthalate which is a derivative of terephthalic acid used as a main component of the acid component is generally called polycyclohexanedimethylene terephthalate (PCT), and itself is known.

As described above, the acid component of the constituent (i) mainly comprises one kind of dibasic acid selected from the group consisting of terephthalic acid, aromatic acids other than terephthalic acid and alicyclic dicarboxylic acids, and usually, terephthalic acid is used. Examples of the aromatic acids other than terephthalic acid include isophthalic acid, methylterephthalic acid, phthalic acid, 4,4'-diphenylmethanedicarboxylic acid, 1,5-naphthalenedicarboxylic acid and 2,6-naphthalenedicarboxylic acid, and examples of the alicyclic dicarboxylic acids include cyclohexenedicarboxylic acid, hexahydroterephthalic acid and tetrahydronaphthalic acid. Further, the glycol component mainly comprises 1,4-cyclohexanedimethanol, but may contain another component as long as the original characteristics of polycyclohexanedimethylene terephthalate are not deteriorated.

The glycol components include, for example, aliphatic and alicyclic glycols such as ethylene glycol, diethylene glycol, triethylene glycol, 1,2-propanediol, 1,3-butanediol, 1,4-butanediol, 1,5-pentanediol, 1,6-hexanediol, 2,2-dimethyl-1,3-propanediol, 1,3-cyclohexanedimethanol, p-xylylenediol and trans(cis)-2,2,4,4-tetramethyl-1,3-cyclobutanediol.

Examples of the dibasic acids include aromatic, aliphatic and alicyclic dicarboxylic acids such as isophthalic acid, methylterephthalic acid, phthalic acid, cyclohexenedicarboxylic acid, dodecanedioic acid, octadecanedicarboxylic acid, 2,2-biphenyldodecanedioic acid, 4,4-biphenyldodecanedioic acid, 1,5-naphthalenedicarboxylic acid and 2,6-naphthalenedicarboxylic acid. In the present invention, short-chain aliphatic, aromatic or alicyclic dicarboxylic acids are preferably used.

In the polyester resin, the constituent (b) of the present invention, 70 mol % or more of the acid component of the constituent (i), based on the total acid component, is preferably a short-chain aliphatic, aromatic or alicyclic dicarboxylic acid. Further, 30 to 70 mol % of the glycol component, based on the total glycol component, is preferably 1,4-cyclohexanedimethanol.

The polyester resin synthesized by using mainly one kind of dibasic acid selected from the group consisting of terephthalic acid, aromatic acids other than terephthalic acid and alicyclic dicarboxylic acids, usually terephthalic acid as with the constituent (i), as the acid component of the constituent (ii) and mainly ethylene glycol as the glycol component is usually called amorphous PET (A-PET), and known in the art. A-PET may contain another component as long as the original characteristics are not deteriorated. The dibasic acid components include aromatic, aliphatic and alicyclic dicarboxylic acids such as isophthalic acid, methylterephthalic acid, phthalic acid, cyclohexanedicarboxylic acid, dodecanedioic acid, octadecanedicarboxylic acid, 2,2-biphenyldodecanedioic acid, 4,4-biphenyldodecanedioic acid, 1,5-naphthalenedicarboxylic acid, 2,6-naphthalenedicarboxylic acid and stilbene-dicarboxylic acid.

Further, examples of the glycol components include aliphatic and alicyclic glycols such as diethylene glycol, triethylene glycol, 1,2-propanediol, 1,3-butanediol, 1,4-butanediol, 1,5-pentanediol, 1,6-hexanediol, 2,2-dimethyl-1,3-propanediol, 1,3-cyclohexanedimethanol, 1,4-cyclohexanedimethanol, p-xylylenediol and trans(cis)-2,2,4,4-tetramethyl-1,3-cyclobutanediol.

In the polyester resin comprising the ingredients (i) and (ii) or the blended polyester resin composition thereof, the composition ratio (molar ratio) of the ingredient (i) to the ingredient (ii) can be arbitrarily established, and the (i)/(ii) is usually 1/9 or more, preferably 5/5 or more, and more preferably 7/3 or more.

Then, examples of the conductive materials used in the present invention include but are not limited to carbon black and carbon fiber.

Of these, carbon black, for example, carbon black produced by the oil furnace process, includes "NITERON" (trade name) manufactured by Nippon steel Chemical Co., Ltd., "SEAST" (trade name) manufactured by Tokai Carbon Co., Ltd., and "CONDUCTEX" (trade name) manufactured by Colombia Carbon Co., ketjen black produced by the special oil furnace process includes "KETJEN EC" (trade name) manufactured by Lion Corp., and acetylene black produced from acetylene gas include "DENKABLACK" (trade name) manufactured by Denki Kagaku Kogyo K. K. Considering both parameters of the specific surface area and volatile component, acetylene black is preferably used.

Further, carbon fiber includes, for example, "DIALEAD" (trade name) manufactured by Mitsubishi Chemical Corp. and "Xylus" (trade name) manufactured by Nitto Boseki Co., Ltd., as pitch carbon fiber, and "BESFIGHT" (trade name) manufactured by Toho Rayon Co., Ltd., as PAN carbon fiber.

The 2-oxazoline ring-containing compound (d) used in the present invention is the general term for compounds having 2-oxazoline rings.

Specific examples of the 2-oxazoline ring-containing compounds (d) include compounds each having one 2-oxazoline ring such as 2-methyl-2-oxazoline which can be synthesized from N-acetylethyleneimine, 2-isopropenyl-2-oxazoline which can be synthesized from N-methacryloylethyleneimine, and 2-phenyl-oxazoline which can be synthesized from N-benzoylethyleneimine.

Further, compounds each having two 2-oxazoline rings include the following compounds:

(1) 2,2'-(1,2-Ethylene)-bis(2-oxazoline)
(2) 2,2'-(1,4-Butylene)-bis(2-oxazoline)
(3) 2,2'-(1,3-Phenylene)-bis(2-oxazoline)
(4) 2,2'-(1,4-Phenylene)-bis(2-oxazoline)
(5) 2,2'-(1,4-Phenylene)-bis(5-methyl-2-oxazoline)

Of the above-mentioned compounds, the phenylenebisoxazoline of (3) or (4) can be practically suitably used.

Besides, examples of the 2-oxazoline ring-containing compounds include polymers in which 2-oxazoline rings are copolymerized. For example, "EPOCROS" (trade name, number average molecular weight: 70,000–80,000) manufactured by Nippon Shokubai Kagaku Kogyo Go., Ltd. is known in which 1 to 5 mol % of 2-ethyl-2-oxazoline is copolymerized with a styrenic monomer.

The compounding ratio of the aromatic polycarbonate resin (a) in the conductive resin composition of the present invention is 60 to 100 parts by weight, preferably 70 to 95 parts by weight, and more preferably 80 to 90 parts by weight, based on the constituents (a) and (b). If the ratio of the constituent (a) is less than 60% by weight, the original mechanical and heat-resistant characteristics of the polycarbonate are unfavorably deteriorated.

The ratio of the polyester resin (b) is 40 to 0 part by weight, preferably 30 to 5 parts by weight, and more preferably 20 to 10 parts by weight, based on the constituents (a) and (b). Exceeding 40 parts by weight unfavorably results in substantial deterioration of the characteristics of the polycarbonate.

Further, the compounding ratio of the conductive material (c) is 5 to 150 parts by weight, preferably 15 to 80 parts by weight, and more preferably 20 to 50 parts by weight, per the total amount of the above-mentioned constituents (a) and (b), 100 parts by weight. Less than 5 parts by weight of the constituent (c) can not provide necessary conductivity, whereas exceeding 150 parts by weight unfavorably results in significant deterioration of processability.

Furthermore, the compounding ratio of the 2-oxazoline ring-containing compound (d) is 0.01 to 10 parts by weight, preferably 0.1 to 5 parts by weight, and more preferably 0.4 to 2 parts by weight, per the total amount of the above-mentioned constituents (a) and (b), 100 parts by weight. Less than 0.01 part by weight can not give a sufficient improvement in moisture absorbability and a strength-improving effect, whereas exceeding 10 parts by weight unfavorably causes deterioration of appearance due to a extreme decrease in viscosity and bleeding out to a surface of a formed article.

In addition to the above-mentioned constituents, various known additives can be added to the compositions of the present invention. Examples of such additives include glass fiber, glass flakes, glass beads, granular substances and whiskers of potassium titanate, aluminum silicate and zinc oxide, and reinforcing agents and extenders such as calcium carbonate, talc and mica. Besides, for example, coloring agents, releasing agents, lubricants, antioxidants and nucleating agents can be appropriately added as so desired.

There is no particular limitation on methods for producing the conductive resin composition of the present invention, and usual methods can be used. That is to say, examples of the general methods include a method of blending and melt-kneading the constituents (a), (b), (c) and (d) together by use of a mixing device such as a super mixer or a tumbler, and a method of melt-kneading them while separately feeding only the constituent (c).

The melt-kneading devices include single screw extruders, double screw extruders, Banbury type mixers, rollers and kneaders, and extruders can be suitably used for the production of the compositions of the present invention.

According to the conductive resin compositions of the present invention, the addition of the specific compounds and further the specific polyester resins can enhance the heat resistance and strength characteristics of the conductive polycarbonate resins, and further can improve the moisture absorbability.

The conductive resin compositions of the present invention are therefore useful for copying machines, office automation devices, containers of electronic parts, IC trays, IC carrier tapes, housing cases, magnetic media and the like.

Further, the compositions of the present invention are reduced in moisture absorbability under the circumstances of high temperature and humidity by addition of the specific polyester resins, as described above. Accordingly, for example, if products requiring secondary processing such as heat processing should be exposed to the circumstances of high temperature and humidity by breakage of packing bags after primary processing, disadvantages such as foaming can be substantially overcome to achieve a high economical effect in processing.

The present invention will be illustrated with reference to examples and comparative examples in more detail below, but the examples are not intended to be limitations on the scope of the invention.

In the examples and comparative examples, parts and percentages are by weight, unless other wise specified, and various constituents used therein are as follows:

Constituent (a)

As polycarbonate resins, "lupilon S-1000" and "lupilon S-2000" (trade names) manufactured by Mitsubishi Gas Chemical Co., Inc., and "CALIBRE 200-13" (trade name) manufactured by Sumitomo Dow Ltd. were used.

Constituent (b)

As a polyester resin, "EASTER DN 003" (trade name, hereinafter also referred to as "PCT-PET") manufactured by Toray Industries,.Inc./Eastman Kodak Co. was used.

This polyester resin was obtained by polymerization using one kind of dibasic acid selected from the group consisting of terephthalic acid, aromatic acids other than terephthalic acid and alicyclic dicarboxylic acids as a main component of the acid component, and 1,4-cyclohexanedimethanol alone or in combination with ethylene glycol as a main component of the glycol component.

For example, the polyester resin was obtained by polymerization using dimethyl terephthalate, a derivative of terephthalic acid, as the acid component, and 1,4-cyclohexanedimethanol as the glycol component.

The polyester resin thus obtained is generally called polycyclohexanedimethylene terephthalate (PCT).

Constituent (c)

As to conductive materials, "DENKABLACK" (trade name, specific surface area: 61 $m^2/g$) manufactured by Denki Kagaku Kogyo K. K. was used as acetylene black, "CONDUCTEX 975" (trade name, specific surface area: 268 $m^2/g$) manufactured by Colombia Carbon Co. was used as furnace black, and "KETJENBLACK EC" (trade name, specific surface area: 950 $m^2/g$) and "KETJENBLACK JD 600" (trade name, specific surface area: 1,270 $m^2/g$) manufactured by Lion Corp. were used as ketjen black (carbon black developed in structure).

Constituent (d)

As an example of a 2-oxazoline ring-containing compound, 2,2'-(1,3-Phenylene)-bis(2-oxazoline) was added. "CP Resin 1,3-PBO" (trade name) manufactured by Takeda Chemical Industries, Ltd. was used.

Further, as an elastomer type compound used in comparative examples, a modified polyolefin thermoplastic elastomer ("Bondine HX 8140" manufactured by Sumitomo Chemical Co., Ltd.) was used which was modified with maleic anhydride, based on "lupilon S-2000" (trade name) manufactured by Mitsubishi Gas Chemical Co., Inc..

EXAMPLES 1 TO 6

Preparation of Sample Pellets

Sample pellets used in Examples 1 to 6 were prepared in the following manner. The polycarbonate resin, the constituent (a), was previously dried under vacuum at 120° C. for 12 hours, followed by preliminary dry blending of the constituents (a) and (d) by means of a tumbler mixer. Then, the resulting mixture was melt-kneaded with a double screw extruder at 260° C. together with the constituent (c) by the two-feed system, and the pellets were prepared from the melt.

Measurement of Physical Characteristics

The above-mentioned sample pellets were formed into test pieces by means of an injection molding machine at a mold clamping pressure of 80 tons at a cylinder temperature of 270° C. at a mold temperature of 100° C. The test pieces were conditioned at 23±2° C. at 50% RH for 24 hours, and then, the tensile elongation, the Izod impact strength and the thermal deformation temperature thereof were measured.

Here, the tensile elongation was measured in accordance with ASTM D638, the Izod impact strength in accordance with ASTM D256 (¼-inch thick sample piece with a notch), and the thermal deformation temperature in accordance with ASTM D648 (weight: 18.6 kg).

Results thereof are shown in Table 1 as Examples 1 to 6.

The results show that the conductive resin compositions of the present invention (Examples 1 to 6) are superior to compositions containing carbon black developed in structure or containing elastomers in strength characteristics.

Comparative Examples 1 to 6

Preparation of Sample Pellets

Sample pellets used in Comparative Examples 1 to 4 were prepared by melt-kneading the constituents (a) and (c) with a double screw extruder at 260° C. by the two feed system in a manner similar to that of Examples 1 to 6, and as sample pellets used in Comparative Examples 5 and 6, commercial pellets were used as such.

Measurement of Physical Characteristics

Test pieces were prepared and the physical characteristics were measured in the same manner as with Example 1.

Results thereof are shown in Table 2 as Comparative Examples 1 to 6.

In all of Comparative Examples, compositions containing no 2-oxazoline ring-containing compounds were used. That is to say, Comparative Examples 1 to 4 correspond to Examples 1 to 4, respectively, and in Comparative Examples 5 and 6, compositions containing elastomers were used. The results reveals that all the compositions of Comparative Examples are deteriorated in tensile elongation and Izod impact strength, resulting in failure to achieve the effect of the present invention.

TABLE 1

| Example | 1 | 2 | 3 | 4 | 5 | 6 |
|---|---|---|---|---|---|---|
| Compounding Formulation (parts) | | | | | | |
| Iupilon S-2000 | 100 | 100 | 100 | — | 100 | 100 |
| Iupilon S-1000 | — | — | — | 100 | — | — |
| Furnace Black KETJENBLACK JD 600 | — | 7 | 7 | 7 | — | — |
| Furnace Black KETJENBLACK EC | 10 | — | — | — | — | — |
| Furnace Black CONDUCTEX 975 | — | — | — | — | 19 | 50 |
| CP RESIN 1,3-PBO | 0.4 | 0.3 | 0.8 | 0.3 | 0.8 | 0.8 |
| Results of Evaluation | | | | | | |
| Volume Resistivity (Ω cm) | 5 × $10^3$ | 5 × $10^2$ | 6 × $10^2$ | 5 × $10^2$ | 7 × $10^4$ | 1 × $10^2$ |
| Tensile Elongation (%) | 25 | 20 | 25 | 62 | 35 | 10 |
| Izod Impact Strength (J/m) | 35 | 35 | 40 | 50 | 44 | 15 |
| Thermal Deformation Temperature (° C.) | 136 | 135 | 135 | 135 | 135 | 137 |

TABLE 2

| Comparative Example | 1 | 2 | 3 | 4 | 5*) | 6*) |
|---|---|---|---|---|---|---|
| Compounding Formulation (parts) | | | | | | |
| Iupilon S-2000 | 100 | 100 | — | 100 | 90 | 95 |
| Iupilon S-1000 | — | — | 100 | — | — | — |
| Modified Olefin TPE | — | — | — | — | 10 | 5 |
| Furnace Black KETJENBLACK JD 600 | — | 7 | 7 | — | — | — |
| Furnace Black KETJENBLACK EC | 10 | — | — | — | 10 | — |
| Furnance Black | — | — | — | 19 | — | — |

TABLE 2-continued

| Comparative Example | 1 | 2 | 3 | 4 | 5*) | 6*) |
|---|---|---|---|---|---|---|
| CONDUCTEX 975 | | | | | | |
| Results of Evaluation | | | | | | |
| Volume Resistivity (Ω cm) | $8 \times 10^2$ | $3 \times 10^2$ | $2 \times 10^2$ | $3 \times 10^4$ | $5 \times 10^3$ | $5 \times 10^3$ |
| Tensile Elongation (%) | 10 | 10 | 30 | 8 | 18 | 20 |
| Izod Impact Strength (J/m) | 18 | 20 | 35 | 15 | 30 | 25 |
| Thermal Deformation Temperature (° C.) | 135 | 134 | 134 | 134 | 129 | 132 |

*)Elastomer blend

EXAMPLES 7 TO 14

Preparation of Sample Pellets

Sample pellets used in Examples 7 to 14 were prepared in the following manner. The polycarbonate resin, the constituent (a), and the polyester, the constituent (b), were previously dried at 120° C. and 70° C., respectively, under vacuum for 12 hours, followed by preliminary dry blending of the constituents (a), (b) and (d) by means of a tumbler mixer. Then, the resulting mixture was melt-kneaded with a double screw extruder at 260° C., together with the constituent (c) by the two-feed system, and the pellets were prepared from the melt.

Measurement of Physical Characteristics

The tensile elongation, the Izod impact strength and the thermal deformation temperature were measured in the same manner as with Examples 1 to 6.

On the other hand, for each composition, a film was formed and the moisture absorbability and the foaming property thereof were measured. That is to say, the film was formed by use of an extruder having a screw diameter of 45 mm at a cylinder temperature of 260° C. to 270° C. at a cast roll temperature of 20° C. while pressing a rubber roll thereon. The thickness of the film was adjusted to 0.2 mm to 0.3 mm.

Then, the resulting film was allowed to absorb moisture under the circumstances of 40° C. and 85% RH with time for 0 to 600 hours, and sampling was carried out for every time. For the resulting sample, the moisture content was measured by the Karl Fischer method. Further, the foaming property was confirmed by rapidly heating the film sample with a gas lighter.

Comparative Examples 7 to 16

Preparation of Sample Pellets

Sample pellets used in comparative Examples 7 to 16 were prepared by melt-kneading the constituent (a) to which the constituent (d) was added or not added without addition of the constituent (b) with a double screw extruder at 260° C. by the two feed system in a manner similar to that of Examples 7 to 14, and the pellets were prepared from the melt.

Measurement of Physical Characteristics

Test pieces and films were prepared and the physical characteristics were measured in the same manner as with Examples 7 to 14.

Results thereof are shown in Tables 3 to 6 as Examples 7 to 14, Comparative Examples 7 to 16.

The results show that the conductive resin compositions of the present invention (Examples 7 to 15) in which the polyester resins (b) are added to the polycarbonate resins (a) are improved in Izod impact strength and excellent in moisture absorption characteristics because no deterioration of the resistance to moisture absorption and the anti-foaming property with the elapse of time is observed.

In contrast, in all of Comparative Examples compositions containing no polyester resins of the present invention were used. That is to say, comparative Examples 7 to 11 correspond to Examples 7 and 8, comparative Examples 8, 12, and 13 correspond to Examples 9 and 10, Comparative Examples 9 and 14 correspond to Examples 11 and 12, and Reference Examples 5 and 6 and Comparative Example 10 correspond to Examples 13 and 14. Compared with Examples 7 to 14, a reduction in Izod impact strength and deterioration of the resistance to moisture absorption and the anti-foaming property with the elapse of time are observed.

TABLE 3

| | Ex. 7 | Ex. 8 | Com. Ex. 11 | Com. Ex. 7 |
|---|---|---|---|---|
| Compounding Formulation (parts) | | | | |
| CALIBRE 200-13 | 90 | 80 | 100 | 100 |
| PCT-PET | 10 | 20 | — | — |
| CP RESIN 1,3-PBO | 0.6 | 0.6 | 0.6 | — |
| Acetylene Black DENKABLACK | 22 | 22 | 22 | 22 |
| Results of Evaluation | | | | |
| Volume Resistivity (Ω cm) | $5 \times 10^5$ | $5 \times 10^5$ | $4 \times 10^5$ | $3 \times 10^5$ |
| Tensile Elongation (%) | 7 | 10 | 7 | 3 |
| Izod Impact Strength (J/m) | 22 | 30 | 16 | 10 |
| Thermal Deformation Temperature (° C.) | 125 | 115 | 133 | 133 |
| 0 Hour | | | | |
| Moisture Content (ppm) | 1700 | 1300 | 1200 | 1800 |
| Foaming Property | ◎ | ◎ | ◎ | ○ |
| 100 Hours | | | | |
| Moisture Content (ppm) | 1800 | 1420 | 4760 | 2500 |
| Foaming Property | ◎ | ◎ | ○ | Δ |
| 300 Hours | | | | |
| Moisture Content (ppm) | 1900 | 1500 | 1900 | 2300 |
| Foaming Property | ◎ | ◎ | Δ | Δ |
| 500 Hours | | | | |
| Moisture Content (ppm) | 1900 | 1510 | 2100 | 2850 |
| Foaming Property | ◎ | ◎ | ○-Δ | Δ-X |

TABLE 4

| | Ex. 9 | Ex. 10 | Com. Ex. 12 | Com. Ex. 8 | Com. Ex. 13 |
|---|---|---|---|---|---|
| Compounding Formulation (parts) | | | | | |
| CALIBRE 200-13 | 90 | 80 | 100 | 100 | 100 |
| PCT-PET | 10 | 20 | — | — | — |
| CP RESIN 1,3-PBO | 0.8 | 0.8 | 0.4 | — | 0.8 |
| Furnace Black KETJENBLACK EC | 10 | 10 | 10 | 10 | 10 |

TABLE 4-continued

|  | Ex. 9 | Ex. 10 | Com. Ex. 12 | Com. Ex. 8 | Com. Ex. 13 |
|---|---|---|---|---|---|
| Results of Evaluation |  |  |  |  |  |
| Volume Resistivity (Ω cm) | $6 \times 10^3$ | $6 \times 10^3$ | $5 \times 10^3$ | $5 \times 10^3$ | $6 \times 10^3$ |
| Tensile Elongation (%) | 20 | 25 | 15 | 12 | 18 |
| Izod Impact Strength (J/m) | 40 | 44 | 30 | 20 | 35 |
| Thermal Deformation Temperature (° C.) | 127 | 117 | 135 | 135 | 135 |
| 0 Hour |  |  |  |  |  |
| Moisture Content (ppm) | 1600 | 1310 | 1950 | 2400 | 1700 |
| Foaming Property | ⊚ | ⊚ | X | X | ⊚ |
| 100 Hours |  |  |  |  |  |
| Moisture Content (ppm) | 1750 | 1300 | 2050 | 5200 | 2500 |
| Foaming Property | ⊚ | ⊚ | X | X | ○ |
| 300 Hours |  |  |  |  |  |
| Moisture Content (ppm) | 1900 | 1420 | 4300 | 5800 | 2500 |
| Foaming Property | ⊚ | ⊚ | X | X | ○ |
| 500 Hours |  |  |  |  |  |
| Moisture Content (ppm) | 2000 | 1500 | 4050 | 5800 | 2200 |
| Foaming Property | ○ | ⊚ | X | X | Δ |

TABLE 5

|  | Ex. 11 | Ex. 12 | Com. Ex. 9 | Com. Ex. 14 |
|---|---|---|---|---|
| Compounding Formulation (parts) |  |  |  |  |
| CALIBRE 200-13 | 90 | 80 | 100 | 100 |
| PCT-PET | 10 | 20 | — | — |
| CP RESIN 1,3-PBO | 0.8 | 0.8 | — | 0.8 |
| Furnace Black | 7 | 7 | 7 | 7 |
| KETJENBLACK JD 600 |  |  |  |  |
| Results of Evaluation |  |  |  |  |
| Volume Resistivity (Ω cm) | $6 \times 10^2$ | $6 \times 10^2$ | $4 \times 10^2$ | $6 \times 10^2$ |
| Tensile Elongation (%) | 25 | 30 | 10 | 23 |
| Izod Impact Strength (J/m) | 45 | 48 | 20 | 40 |
| Thermal Deformation Temperature (° C.) | 127 | 118 | 134 | 135 |
| 0 Hour |  |  |  |  |
| Moisture Content (ppm) | 1500 | 1300 | 2500 | 1700 |
| Foaming Property | ⊚ | ⊚ | X | ⊚ |
| 100 Hours |  |  |  |  |
| Moisture Content (ppm) | 1800 | 1330 | 5500 | 2900 |
| Foaming Property | ⊚ | ⊚ | X | ○–Δ |
| 300 Hours |  |  |  |  |
| Moisture Content (ppm) | 1820 | 1400 | 5800 | 2500 |
| Foaming Property | ⊚ | ⊚ | X | ○–Δ |
| 500 Hours |  |  |  |  |
| Moisture Content (ppm) | 1950 | 1480 | 6000 | 2300 |
| Foaming Property | ⊚ | ⊚ | X | ○–Δ |

TABLE 6

|  | Ex. 13 | Ex. 14 | Com. Ex. 15 | Com. Ex. 16 | Com. Ex. 10 |
|---|---|---|---|---|---|
| Compounding Formulation (parts) |  |  |  |  |  |
| CALIBRE 200-13 | 90 | 80 | 100 | 100 | 100 |
| PCT-PET | 10 | 20 | — | — | — |
| CP RESIN 1,3-PBO | 0.8 | 0.8 | 0.4 | 0.8 | — |
| Furnace Black CONDUCTEX 975 | 19 | 19 | 19 | 19 | 19 |
| Results of Evaluation |  |  |  |  |  |
| Volume Resistivity (Ω cm) | $7 \times 10^4$ | $6 \times 10^4$ | $6 \times 10^4$ | $7 \times 10^4$ | $3 \times 10^4$ |
| Tensile Elongation (%) | 42 | 48 | 25 | 35 | 3 |
| Izod Impact Strength (J/m) | 50 | 52 | 20 | 44 | 10 |
| Thermal Deformation Temperature (° C.) | 127 | 118 | 134 | 135 | 133 |
| 0 Hour |  |  |  |  |  |
| Moisture Content (ppm) | 1300 | 1250 | 2430 | 1600 | 2800 |
| Foaming Property | ⊚ | ⊚ | ○–Δ | ○ | Δ–X |
| 100 Hours |  |  |  |  |  |
| Moisture Content (ppm) | 1400 | 1280 | 2700 | 2200 | 4000 |
| Foaming Property | ⊚ | ⊚ | Δ | ○ | X |
| 300 Hours |  |  |  |  |  |
| Moisture Content (ppm) | 1500 | 1350 | 2900 | 2500 | 4300 |
| Foaming Property | ⊚ | ⊚ | Δ–X | ○ | X |
| 500 Hours |  |  |  |  |  |
| Moisture Content (ppm) | 1700 | 1420 | 2600 | 2600 | 5000 |
| Foaming Property | ⊚ | ⊚ | Δ–X | ○–Δ | X |

What is claimed is:

1. A conductive resin composition comprising an aromatic polycarbonate resin (a), a polyester resin (b) having mainly a skeleton of cyclohexanedimethanol as a glycol component, a conductive material (c) and a 2-oxazoline ring-containing compound (d) represented by the following general formula (1), wherein the amount of said conductive material (c) is 5 to 150 parts by weight and the amount of said 2-oxazoline ring-containing compound (d) is 0.01 to 10 parts by weight, per 100 parts by weight of the total of 70 to 95 parts by weight of said aromatic polycarbonate resin (a) and 30 to 5 parts by weight of said polyester resin (b):

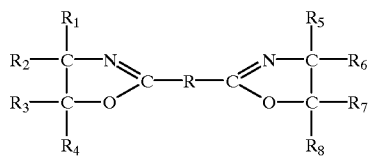
(I)

wherein R represents an alkyl group having 1 to 10 carbon atoms, an alkyl-substituted or unsubstituted phenyl group having 1 to 10 carbon atoms, an alkylene group having 2 to 10 carbon atoms or a 1,3- or 1,4-phenylene group; and $R_1$ to $R_8$ which may be the same or different, represent hydrogen atoms or alkyl groups each having 1 to 10 carbon atoms.

2. The conductive resin composition according to claim 1, wherein said polyester resin (b) is a copolyester resin constituted by repetition of (i) a unit comprising mainly one kind of dibasic acid selected from the group consisting of terephthalic acid, aromatic acids other than terephthalic acid and alicyclic dicarboxylic acids as an acid component, and mainly cyclohexanedimethanol as a glycol component, and (ii) a unit comprising mainly one kind of dibasic acid selected from the group consisting of terephthalic acid, aromatic acids other than terephthalic acid and alicyclic dicarboxylic acids as an acid component, and mainly ethylene glycol as a glycol component.

3. The conductive resin composition according to claim 1, wherein said polyester resin (b) is a polyester resin composition obtained by blending (i) a polymer constituted by repetition of a unit comprising mainly one kind of dibasic acid selected from the group consisting of terephthalic acid, aromatic acids other than terephthalic acid and alicyclic dicarboxylic acids as an acid component, and mainly cyclohexanedimethanol as a glycol component with (ii) a polymer constituted by repetition of a unit comprising mainly one kind of dibasic acid selected from the group consisting of terephthalic acid, aromatic acids other than terephthalic acid and alicyclic dicarboxylic acids as an acid component, and mainly ethylene glycol as a glycol component.

4. The conductive resin composition according to claim 1, wherein said polyester resin (b) is a polymer constituted by repetition of (i) a unit comprising mainly one kind of dibasic acid selected from the group consisting of terephthalic acid, aromatic acids other than terephthalic acid and alicyclic dicarboxylic acids as an acid component, and mainly cyclohexanedimethanol as a glycol component.

5. The conductive resin composition according to claim 1, wherein said conductive material (c) is carbon black and/or carbon fiber.

6. The conductive resin composition according to claim 1, wherein said 2-oxazoline ring-containing compound (d) is a 2-oxazoline ring-containing compound and/or a high-molecular compound obtained by (graft) copolymerization of a 2-oxazoline ring-containing compound.

* * * * *